United States Patent [19]

Najjar et al.

[11] Patent Number: 4,776,705
[45] Date of Patent: Oct. 11, 1988

[54] THERMOCOUPLE FOR USE IN A HOSTILE ENVIRONMENT

[75] Inventors: Mitri S. Najjar, Hopewell Junction, N.Y.; Thomas F. Leininger, Walnut, Calif.

[73] Assignee: Texaco Inc., White Plains, N.Y.

[21] Appl. No.: 60,801

[22] Filed: Jun. 11, 1987

[51] Int. Cl.⁴ .............................................. G01K 1/08
[52] U.S. Cl. ................................... 374/139; 136/234; 374/125; 374/141; 431/121
[58] Field of Search ............... 374/125, 139, 140, 141; 136/230; 431/121

[56] References Cited

U.S. PATENT DOCUMENTS

| | | | |
|---|---|---|---|
| 3,080,755 | 3/1963 | Percy | 374/125 |
| 4,324,945 | 4/1982 | Sivyer | 136/230 |
| 4,435,093 | 3/1984 | Krause et al. | 374/125 |
| 4,466,808 | 6/1986 | Colls | 48/DIG 2 |
| 4,510,343 | 4/1985 | Sivyer | 136/230 X |

FOREIGN PATENT DOCUMENTS

| | | | |
|---|---|---|---|
| 0578199 | 6/1959 | Canada | 136/230 |
| 45-21240 | 4/1965 | Japan | 374/179 |

Primary Examiner—Daniel M. Yasich
Attorney, Agent, or Firm—Robert A. Kulason; James J. O'Loughlin; Robert B. Burns

[57] ABSTRACT

A thermocouple system for use in a high temperature reactor wherein a carbonaceous fuel is burned to produce a usable gas and a residual slag. The thermocouple is enclosed in a gas tight metal protection sheath which is inserted inside a multi-segment refractory thermowell. An annular space formed between the sheath and the thermowell is continuously purged with a minute quantity of a gas or a gaseous mixture. Gasification products from the residual slag, which are normally in a form that reacts with and destroys the thermocouple wires, are neutralized within the annular space by reaction with the purge gas mixture.

7 Claims, 1 Drawing Sheet

THERMOCOUPLE FOR USE IN A HOSTILE ENVIRONMENT

BACKGROUND OF THE INVENTION

The generation of synthesis gas by the high temperature partial combustion of a carbonaceous fuel, wherein the fuel is an ash containing petroleum coke, normally results in the production of a quantity of a usable gas together with a slag residue. The slag is usually comprised of a variety of compounds, including compounds of certain metals such as iron, nickel and vanadium, depending upon the composition of the coke feedstock.

Unfortunately, the presence of some of these metals introduces severe operating conditions into the gasification process, particularly when the metals are in their free state. This happens because, at the high temperatures found within the gasification process, the various metals present in the residue slag can take a form which will react unfavorably with certain components of the process equipment. An example of this is the high temperature ceramic refractory materials used for gasifier combustion chamber linings and for combustion chamber thermowells.

In the above mentioned gasification process, a high pressure gasifier is fed a pressurized stream of pulverized coke. The coke is combusted in the gasifier combustion chamber at a temperature within the range of 2000° F. to 3200° F., and preferably between 2500° F. to 2800° F., and at a pressure of approximately 5 to 250 atmospheres.

To adequately control the gasification process and ensure the safe operation of the process equipment, it is necessary to monitor the temperature inside the refractory lined gasifier combustion chamber. Among the most commonly used methods is to insert one or more thermocouples into the combustion area through a flanged opening in the gasifier vessel wall.

These process thermocouples are usually fabricated from commercially available noble metal thermocouple wire pairs, such as type B platinum/rhodium wire pairs. The wires are electrically insulated from each other by high temperature ceramic material such as alumina or magnesia. The insulated wire pair is enclosed in some form of protective sheath which can be made from ceramic or metal and which permits corrosive process gases from coming into direct contact with the wires.

Due to the generally aggressive nature of the residue slag, the sheathed thermocouple is placed inside a thermowell. The latter is usually constructed from material having a greater resistance to slag attack than does the thermocouple sheath.

The entire assembly is inserted into the gasifier via a hole drilled through the refractory lining. Thus, the tip of the thermowell is flush with the inner suface of the reactor combustion chamber. The hole in the vessel refractory lining communicates with a flanged opening in the vessel wall. Said opening permits passage of the thermocouple wire pair through a pressure seal fitting for connection with appropriate temperature display instrumentation.

Thermocouple failure is a frequent occurrence under the severe conditions encountered in a gasification reactor. Failure usually occurs when the thermocouple circuit formed by the wire pair is damaged. This results either by reactive species contaminating the wires, which leads to an error in the temperature indication, or by molten slag destroying a section of one of both wires. The latter causes the thermoelectric circuit to either open or to short-circuit.

For such damage to occur, molten slag, or a given reactive species, must first penetrate the ceramic refractory thermowell. It must then span the gap between thermowell and thermocouple protective sheath, and finally penetrate the protective sheath and insulation surrounding the wires.

Slag penetration will normally occur in one of two ways. The aggressive, molten slag can work its way through the refractory thermowell by corrosion, erosion and/or diffusion. Alternatively, the slag can rapidly move into the thermowell through cracks resulting from thermal shock. Such shocks can occur during upset conditions, or when the gasifier is started up or shut down.

Slag penetration via the first mechanism is particularly severe during coke gasification where the extremely corrosive slag easily penetrates even the most slag resistant refractory thermowell materials. For example, analysis of damaged thermowells made from Zirchrom 60, a commerically available refractory material, showed that coke slag has penetrated along minute cracks and grain boundaries. Once inside the thermowell, certain components of the coke slag, free iron in particular, migrated towards the thermocouple and reacted with the platinum protective sheath and thermocouple wires. such contact usually results in failure of the thermocouple.

It has also ben experienced that, upon occasion, even certain components of the ceramic refractory thermowell will migrate out of the thermowell and into the thermocouple. Here they will react with the wires at the high temperatures found inside the combustion section of a coke gasifier. It has been found from experience that even with the best available materials, daily replacement of damaged thermocouples is not uncommon.

To overcome the pervading difficulty encountered in gasifier operation, there is provided, in brief, a thermocouple assembly capable of functioning in the high temperature, high pressure, aggressive environment normally found inside an operating coke gasifier.

The thermocouple assembly is constructed with a noble metal (such as platinum) wire pair, such as a type R or type B wire pair, having an ungrounded junction, and which is insulated by dense magnesia. The noble metals referred to include, but are not limited to, gold, platinum, paladium, rhodium and ruthenium. The insulated wire pair is provided with a gas tight protective sheath of noble metal or noble metal alloy, such as pure platinum or platinum/rhodium alloy, which will not react with most of the aggressive constituents found inside the gasifier.

Surrounding the sheathed thermocouple is a thermowell made of at least two concatenated tubualr segments of refractory material capable of slowing the movement of slag components towards the thermocouple. The density, porosity, coefficient of thermal expansion and thermal conductivity of each of the segments is matched with those of the surrounding layers of gasifier refractory material. Thus, the thermowell will be less susceptible to thermal shock cracking and rapid invasion by slag.

The space between the sheathed thermocouple and the refractory thermowell defines an annular passage for conducting a stream of a purging and oxidizing and/or sulfiding gas which forms a dynamic envelope about the thermocouple. The flow rate of purge gas is controlled so that it is sufficiently high to maintain a critical partial pressure of oxygen and/or sulfur. The flow rate is low enough, however, so that the flow of gas does not introduce measurable error into the measured temperature indication as a result of convective cooling of the thermocouple junction.

Functionally, when the deleterious components of the molten slag, such as metals in the free state, and metallic iron in particular, eventually penetrate the thermowell, they will contact and react with the oxidizing and/or sulfiding gas prior to reaching the interior parts of the thermocouple assembly. Once in the oxidized or sulfided form, the aggressive components, and iron in particular, will have been neutralized and will no longer be able to attack and destroy the thermocouple protective sheath or the thermocouple wires. The oxidized and/or sulfided components are then swept out of the annular passage by the dynamic motion of the gas purge.

It is therefore an object of the invention to provide a thermocouple assembly which is capable of resisting physical deterioration when exposed to a hostile, high temperature environment.

A further object is to provide a thermocouple of the type described which is capable of functioning in the high temperature environment of a coke gasifier, by neutralizing the effect of the reactive elements in the slag which would otherwise destroy the thermocouple.

It is a still further object to provide a thermocouple of the type just described which is capable of resisting slag penetration by constructing the refractory thermowell in a manner which is less susceptible to thermal shock cracking and rapid slag invasion.

The invention briefly stated, comprises a temperature measuring or monitoring system for a reactor which includes a wall defining a refractory lined combustion chamber. A stream of pulverized carbonaceous fuel introduced to the combustion chamber is burned or gasified at a high temperature and pressure to yield a usable gas and a residual, free metal containing slag.

A multi-refractory thermowell is registered in an access passage which transverses the combustion chamber wall to define a refractory jacket, closed at one end adjacent to the combustion chamber wall. A cap removably depends from the reactor outer wall to form a gas tight closure chamber about the thermowell open end.

A gas conduit communicated with a source of a purge gas extends the length of the thermowell to introduce a controlled flow of purge gas to the latter. A thermocouple positioned in the thermowell is thereby enveloped in a controlled stream of the purge gas. The latter will thus react with the free metal contained in the slag, thereby protecting the thermocouple from damage which could result from contact between the thermocouple and the free metal components of the slag.

Figure 1:
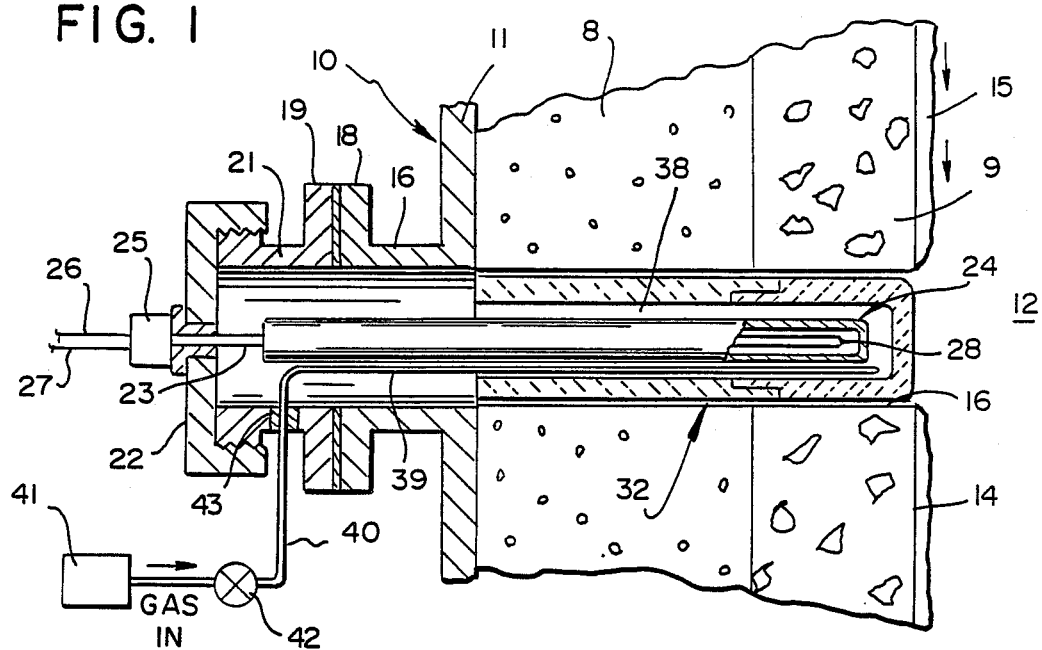
FIG. 1 is a segmentary view in cross-section of a portion of a reactor wall in which a thermocouple and thermowell are installed.

The various parts, their functions, and their interrelationship in the novel thermocouple disclosed, are most readily understood by referring to FIG. 1. Said Figure shows the invention installed in the combustion chamber of a typical reactor used for producing a usable gas by the combustion of coke with an oxidizing gas. One such reactor is shown and described in U.S. Pat. No. 4,466,808.

In a generally vertical reactor of this type, an ash containing coke is introduced to the reactor combustion chamber upper end on a stream of a combustion supporting or oxidizing gas. The fuel is gasified at a high temperature, the resulting gas and solid effluent then flow downward to enter a cooling zone or compartment. In the latter, a liquid both cools the entering stream, and effects a separation of most of the solid ash from the gaseous phase.

Gasifier or reactor 10 is comprised in one embodiment of a steel shell 11 having a combustion chamber 12 formed therein. The chamber is fed with pressurized streams of pulverized coke and oxidizing gas via a burner, not shown, normally positioned at the top of the combustion chamber.

To withstand the expected operating temperatures of up to 3200° F., the inner wall of reactor shell 11 is lined with a refractory material to a thickness dependent on the size of the reactor and the temperatures at which it normally functions. The refractory lining, to function most effectively, can consist of several layers comprising at least two distinct zones 8 and 9. Zone 9 preferably consists of slag resistant material having a high density and high thermal conductivity. Zone 8 preferably consists of thermal insulation material having a much lower density and lower thermal conductivity.

In general, the slag produced as a by-product of the gasification process, passes through the lower end of the reactor combustion chamber 12 and into a gas/solid separation chamber, not shown. In said separation chamber, slag is separated from the usable product gas and sent to further processing or disposal. Some of the slag passes directly into the separation chamber without coming into contact with the refractory lined walls of combustion chamber 12. The major part of the slag, however, flows as a viscous mass 15 downwardly along the combustion chamber surface 14 and towards the openings of the thermocouple holes 16 which are oriented radially through the refractory lining zones 8 and 9.

Thermocouple holes 16 open into combustion chamber 12. Usually two, and preferably at least four such thermocouple holes are formed in the reactor wall, each being adapted to receive a thermocouple. The thermocouple arrangment is designed for the purpose of most accurately monitoring temperature conditions within combustion chamber 12.

Each thermocouple hole 16 communicates with a flanged thermocouple nozzle 17 on the reactor shell 11 outer wall. Each nozzle 17 includes a flange 18 which mates with a corresponding flange 19 of a cylindrical housing 21. The housing 21 has a removable end cap 22 having a pressure sealing fitting 25 registered therein. When the thermocouple wire pair 23 is passed through fitting 25, and the fitting is tightened into place, no gas leaks through the fitting, and the pressure integrity of the combustion chamber is maintained.

Figure 2:
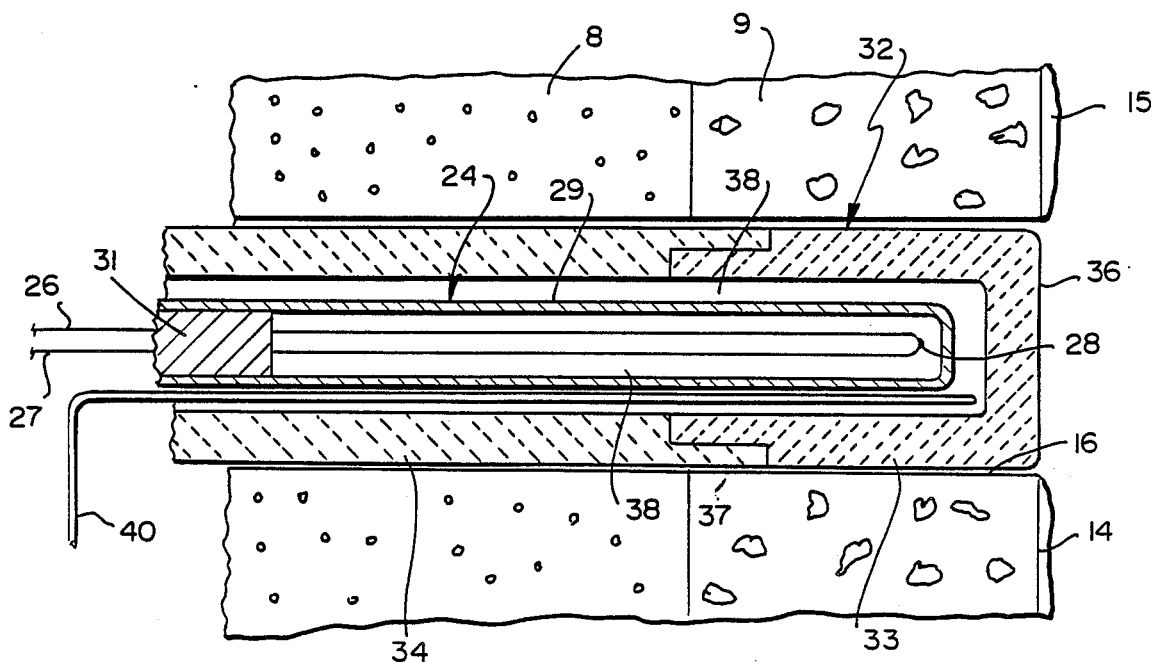
FIG. 2 is a segmentary view on a larger scale of the thermocouple in FIG. 1.

Referring to FIG. 2, thermocouple 24 is fabricated from a pair of noble metal thermocouple wires 26 and 27 which are joined at thermocouple junction 28. The wires are surrounded by a protective sheath 29 which is closed adjacent the junction end, and which forms an essentially gas tight housing.

It has been found that, for coke gasification use, protective sheath 29 is best made from a noble metal or noble metal alloy such as platinum/rhodium. Alternatively, a protective sheath of high density, low porosity magnesia can be used. Wires 26 and 27 are electrically insulated from each other and from the protective sheath by a high temperature refractory insulation 30 such as magnesia.

The remote or free ends of the thermocouple wires 26 and 27 extend past the back end of the protective sheath 29 and pass through the pressure sealing fitting 25. A plug 31 formed of high temperature epoxy and/or other high temperature cement, defines a gas tight seal at the back end of the protective sheath. The length of the gas tight protective sheath 29 is generally selected such that the sheath sealed end is located as close as possible to the pressure sealing fitting 25. The temperature at the plug end is known to be cool relative to the temperature at the active junction end 28.

To impede movement of aggressive slag species in the direction of thermocouple 24 during operation in a reactor, the thermocouple is also protected by a thermowell 32. The latter is comprised of at least two cooperating segments 33 and 34. The material chosen for fabrication of the respective segments is selected so that the thermal, chemical and physical properties of the segment closely match the properties of the adjacent refractory material at the wall of combustion chamber lining 13.

The first segment 33 of thermowell 32 is generally comprised of a hollow tube having a closed end or face 36 which is positioned adjacent to the combustion chamber 12. It further includes an open end which communicates with, and connects to second segment 34. First segment 33 is exposed to the highest temperature, and is fabricated from a material having the greatest resistance to attack by the flow of molten slag 15 with which it is in direct contact. To best achieve its desired function, thermowell segment 33 is fabricated from a high density, low porosity refractory material such as hot pressed chromia-magnesia refractory.

The second segment 34 of thermowell 32 is generally comprised of a hollow tube, with opposed open ends. It is joined coaxially with first segment 33 by a tight cement bond at joint 37. Because second segment 34 is adjacent to or lies within a regions 8 and 9 in the combustion chamber wall lining through which there is a large temperature gradient, the material used for this segment must be particularly resistant to cracking under thermal and mechanical stress. Consequently, second segment 34 is formed of a less dense, more porous refractory material such as cold molded and fired chromia-alumina-zirconia refractory.

Thermowell 32 is installed, as shown in FIG. 1, in thermocouple hole 16 which extends through both combustion chamber lining sections 8 and 9, having a diameter slightly larger than the maximum outside diameter of the multi-segment thermowell 32. The thermowell inner end can terminate flush with the hot face of the combustion chamber wall 14, or alternatively, it can terminate with its face 36 a desired distance set back from the surface 14. An elongated annulus 38 is thereby defined between contiguous walls of thermowell 32, and thermocouple sheath 29.

To achieve the desired gas circulation or flow through annulus 38, a long, thin, purge tube 39 is positioned in annulus 38 so that its open end terminates adjacent to the tip of thermocouple 24. Tube 39 is fabricated preferably of a noble metal or a noble metal alloy such as platinum/rhodium. Thus it can withstand the high temperature and the hostile environment normally present in the region near the thermocouple tip.

A mechanically and physically stronger or more durable stainless steel extension tube 40 passes through a pressure sealing fitting 43 in a wall of housing 21, and is communicated with purge tube 39. From source 41, a purge gas having the desired oxidizing and/or sulfiding capabilities is metered into thermocouple annulus 38 via control valve 42.

Operationally, purge gas which exits from the open end of the purge tube 39 near the tip of thermocouple 24, fills annulus 38 and sweeps across the exterior surface of the thermocouple protective sheath 29. Within the annular space 38, any species which are harmful to the thermocouple sheath and wires, particularly metals in the free state, are neutralized by contact with the purge gas, and rendered harmless by the oxidizing and/or sulfiding reactions.

The purge gas stream, now containing neutrailized compounds, then exits the open back end of the annular space 38 and bleeds into the annular space between the refractory thermowell 32, and the thermocouple hole 16.

This very small or minor amount of exiting gas mixes with gas in combustion chamber 12 and will be carried from the gasifier. By using an appropriate purge gas mixture, the gas flow rate can be controlled in such a way as to maintain the required oxidizing and/or sulfiding potential inside annular space 38, without introducing measurable error into the temperature indication as a result of convective cooling of the thermocouple junction 28.

To achieve the desired neutralizing of the platinum attacking element, purge gas that interacts with iron is experienced in a low flow of a mildly oxidizing $CO_2$. Alternatively, $H_2S$ as the purge gas will prevent the reduction of ferrous species in the molten slag to iron.

It is understood that although modifications and variations of the invention can be made without departing from the spirit and scope thereof, only such limitations should be imposed as are indicated in the appended claims.

We claim:

1. In a temperature monitoring system for a reactor having a refractory lined wall which defines a combustion chamber in which a carbonaceous fuel is gasified at a high temperature to produce a usable gas, and a residual slag comprising an amount of free metal therein, said combustion chamber refractory lined wall including means forming an access passage (16) with an opening at the combustion chamber, a multi-segment thermowell (32) removably registered in said access passage (16) defining an annulus (38) therewith, having a closed end wall (36) disposed contiguous with the combustion chamber wall, and an open end, said thermowell (32 being comprised of discrete first (33), and second (34) cylindrical segments, each thereof being formed of a different refractory material, means forming a removable, gas tight closure (22) at said refractory lined wall adjacent the thermowell open end, a thermocouplee (24) removably received in said thermowell and having thermocouple wires (26)

and (27) which pass through said gas tight closure (22), and a gas conduit means (39) communicated with a pressurized source (41) of purge gas and opening into said thermowell (32) to envelop said thermocouple (24) with a flow of purge gas which exits into said combustion chamber (12).

2. In the apparatus as defined in claim 1, wherein said purge gas is reactive with the free metal in said residual slag.

3. In the apparatus as defined in claim 1, including means (42) communicated with the gas conduit means (39) for metering the stream of purge gas which enters said thermowell (32).

4. In the apparatus as defined in claim 1, wherein said gas conduit means 39 includes an elongated tubular member extending longitudinally of the thermocouple (24) and having a discharge opening positioned adjacent the thermowell end wall (36).

5. In the apparatus as defined in claim 1, wherein said multi-segment thermowell (32) first segment (33) is positioned nearest to the combustion chamber (12) wall, and formed of a first refractory material, and said second segment (34) is connected to the first segment (33) and formed of a second refractory material having a density in excess of the density of said first refractory material.

6. In the apparatus as defined in claim 5, wherein said first segment is fabricated of a chromia-magnesia refractory.

7. In the apparatus as defined in claim 5, wherein said second segment is fabricated of chromia-alumina-zirconia refractory.

* * * * *